Feb. 8, 1949.  A. G. GOLDBERG  2,461,114
LICENSE PLATE MOUNTING FOR VEHICLES
Filed Sept. 25, 1947
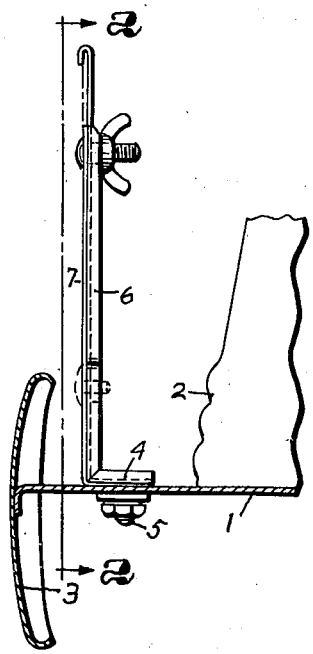
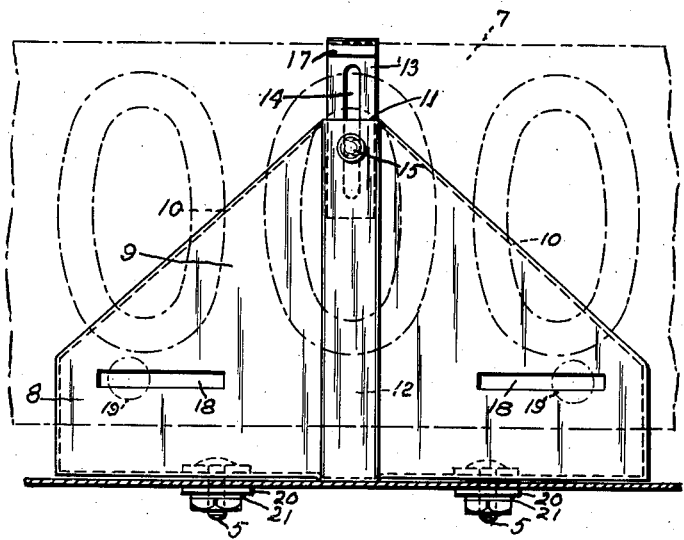
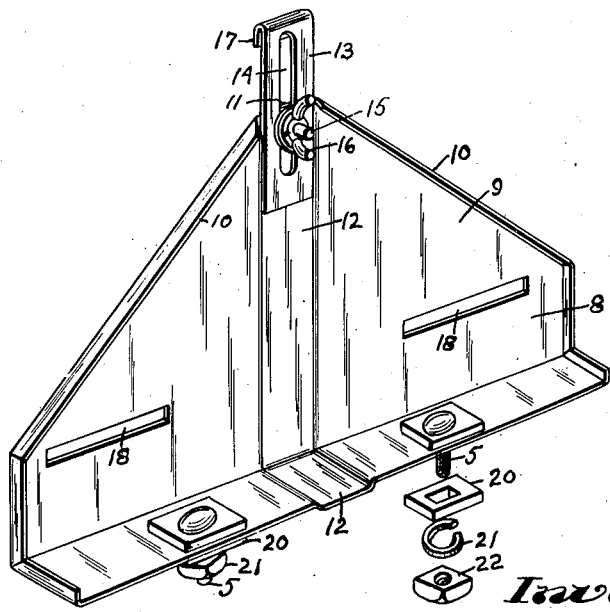
Inventor:
Abraham G. Goldberg,
by Heard Smith & Tennant
Attorneys Patented Feb. 8, 1949

2,461,114

UNITED STATES PATENT OFFICE 2,461,114

LICENSE PLATE MOUNTING FOR VEHICLES

Abraham G. Goldberg, Chestnut Hill, Mass.

Application September 25, 1947, Serial No. 776,123

2 Claims. (Cl. 248—226)

This invention relates to improvements in license plate mountings for vehicles, such as automobiles, particularly of a modern type which have horizontal sheet metal extensions mounted upon the chassis and extending rearwardly and/or forwardly therefrom at the junction of the body to the chassis. Heretofore license plate mountings for such vehicles have been provided which are secured to the body of the vehicle or to the door of the rear baggage compartment of the vehicle, or to a rear mud guard, and in such States as require license plates to be provided for both the front and the rear of the vehicle to brackets mounted upon the frame of the vehicle or the bumpers of the vehicle.

The object of the present invention is to provide a license plate mounting which can be readily secured to the plate or plates projecting from the vehicle at the junction of the body to the chassis thereof, and which will fixedly secure the license plate in place.

Another object of the invention is to provide a license plate mounting of the character described having means for clamping the license plate firmly in place and provided with means whereby a license plate can be readily removed by the loosening of a single bolt and a new plate substituted therefor.

Another object of the invention is to provide a license mounting wholly made of sheet metal and reinforced against distortion.

These and other objects and features of the invention will more fully appear from the following description and the accompanying drawings and will be particularly pointed out in the claims.

A preferred embodiment of the invention is illustrated in the accompanying drawing, in which, Fig. 1 is a vertical sectional view illustrating the license plate bracket mounted upon the plate extending rearwardly from the lower edge of the body to the bumper of the vehicle;

Fig. 2 is a vertical sectional view on line 2—2 Fig. 1; and,

Fig. 3 is a perspective view of the license plate mounting illustrating in exploded view the manner in which one of the bolts for securing the horizontal flange of the license plate bracket to the plate which extends rearwardly or forwardly from the junction of the body to the chassis of the vehicle.

The license plate mounting is illustrated in Fig. 1 as applied to a horizontal sheet metal plate 1 which extends rearwardly from the body 2 of the vehicle at the junction thereof to the chassis and, as shown, is attached to the bumper 3 of the vehicle. The license plate as illustrated comprises a bracket having a horizontal flange 4 which is secured by bolts 5 to the plate 1 and has a vertical section 6 extending perpendicularly from the flange 4 and provided with means for clamping the license number plate 7 to the rear face of the bracket. The bracket 6 may be of any suitable rigid material but preferably is of an integral sheet of suitable rigid metal having a flat plate extending upwardly from and integral with the horizontal flange 4. The upwardly extending plate comprises a lower horizontal rectangular portion 8 and a truncated triangular portion 9 continuing upwardly therefrom. The edges of the horizontal flange, the rectangular portion 8, and the upwardly extending continuing triangular portion desirably are provided with an inwardly bent reinforcing flange 10 terminating at the edge of the truncated end portion 11. The plate 6 is provided with an outwardly offset narrow rectangular portion extending from the truncated end portion 11 downwardly perpendicularly to the flange 4 and desirably extending across the horizontal flange 4 forming a channel 12. A sheet metal clamping member 13, which slidably fits within the channel 12, is provided with a longitudinally extending slot 14 through which a bolt 15, which is mounted in the upper end portion of the truncated member extends, and is clamped thereon preferably by a winged bolt 16. The upper end of the clamping member 13 is provided with a hooked end portion 17 adapted to engage over the upper edge of the license plate. The rectangular portion of the vertical plate of the bracket is provided with parallel preferably alined slots 18 complementary to the usual slots in the lower portion of the license plate 7 and the license plate is adapted to be secured at its lower portion to the bracket by usual bolts 19 illustrated in dotted lines in Fig. 2.

The bolts 5, which secure the horizontal flange of the bracket to the plate 1, desirably are provided with rectangular washers 20 of a thickness corresponding to the offset portion 12 of the horiztonal flange and a lock washer 21 which surrounds the bolt 5 is interposed between the washer 20 and the nut 22 on the bolt 5.

In the operation of the device the flange 4 of the bracket is bolted to the plate 1 in any desired position upon the latter. The license plate 7 then secured to the rear bracket 6 by the bolts 19 extending through the slots in the rectangular portion of the bracket. The winged nut 15 which secures the clamping plate 13 having been loosened before the license plate is thus secured to the bracket is then forced downwardly until its bent end portion 17 tightly embraces the upper edge of the license plate after which the clamping member is forced downwardly to clamp the license plate also upon the bolts which pass through the slots 18. The bolt 15 is then set up tightly thereby firmly securing the license plate upon the bracket.

The license plate mounting thus positioned more effectively displays the license plate than those which are mounted upon the body of the vehicle. It is protected by the plate 1 and bumper 3 from dirt and gravel projected upwardly from the road by the rear wheels of the vehicle. It is more accessible to the changing of a license plate for one year to that of another. It can be readily and cheaply manufactured from good material and comprises other advantages which will be appreciated by the user thereof.

It is to be understood that the license plate particularly shown and described herein is of an illustrative character, that various changes in form, construction and material may be made, and that a plurality of clamping members engaging over the edge of the license plate or adjustably secured to the bracket in a different manner may be employed within the spirit and scope of the following claims.

Having thus described the invention, what is claimed as new, and desired to be secured by Letters Patent, is:

1. A mounting, for a vehicle license plate having slots parallel to the lower edge thereof, comprising an integral sheet metal bracket having a horizontal flange adapted to be connected to a plate extending horizontally forwardly or rearwardly from the vehicle at the junction of the body to the chassis thereof, said bracket having a vertical plate supporting section extending upwardly from said horizontal flange having a wide rectangular portion adjacent said flange and a truncated triangular portion continuing upwardly from said rectangular portion, a narrow rectangular offset extending outwardly from said truncated end of the triangular portion perpendicular to said flange forming a channel, slots in said rectangular portion spaced from and parallel to said frame complementary to the slots in said license plate adapted to receive bolts connecting the license plate to the bracket and a sheet metal member slidably fitting said channel having an outwardly reversely bent end adapted closely to embrace the upper edge of said license plate, and means for adjustably securing said clamping member in said slot thereby to clamp the license plate firmly to the bracket and upon said bolts.

2. A mounting, for a vehicle license plate having slots parallel to the lower edge thereof, comprising an integral sheet metal bracket having a horizontal flange adapted to be connected to a plate extending horizontally forwardly or rearwardly from the vehicle at the junction of the body to the chassis thereof, said bracket having a vertical plate supporting section extending upwardly from said horizontal flange having a wide rectangular portion adjacent said flange and a truncated triangular portion continuing upwardly from said rectangular portion, the marginal edge of said rectangular and truncated triangular portion having a narrow marginal reinforcing flange bent inwardly therefrom, a narrow rectangular offset extending outwardly from said truncated end of the triangular portion perpendicular to said flange forming a channel, slots in said rectangular portion spaced from and parallel to said frame complementary to the slots in said license plate adapted to receive bolts connecting the license plate to the bracket and a sheet metal member slidably fitting said channel having an outwardly reversely bent end adapted closely to embrace the upper edge of said license plate, and a slot longitudinally of said member, a bolt mounted in said bracket adjacent the top of said truncated portion, and a winged nut on said bolt engaging said slot adapted to clamp the license plate against said bracket and also against the bolts which connect the license plate to the bracket.

ABRAHAM G. GOLDBERG.

REFERENCES CITED

The following references are of record in the file of this patent:

UNITED STATES PATENTS

| Number | Name | Date |
| --- | --- | --- |
| 1,154,847 | De Vore | Sept. 28, 1915 |
| 1,227,165 | Marvin | May 22, 1917 |
| 2,062,156 | Zerbst | Nov. 24, 1936 |
| 2,266,715 | Parrot | Dec. 16, 1941 |